(12) United States Patent
Asai et al.

(10) Patent No.: US 8,419,992 B2
(45) Date of Patent: Apr. 16, 2013

(54) MOLD FOR GASKET, METHOD FOR MANUFACTURING THE GASKET, AND GASKET

(75) Inventors: Kazuyuki Asai, Aso (JP); Daihachi Shojima, Aso (JP); Kenta Kohatsu, Aso (JP)

(73) Assignee: NOK Corporation, Tokyo (JP)

( * ) Notice: Subject to any disclaimer, the term of this patent is extended or adjusted under 35 U.S.C. 154(b) by 1196 days.

(21) Appl. No.: 12/227,065

(22) PCT Filed: May 11, 2007

(86) PCT No.: PCT/JP2007/059700
§ 371 (c)(1),
(2), (4) Date: Nov. 6, 2008

(87) PCT Pub. No.: WO2007/132747
PCT Pub. Date: Nov. 22, 2007

(65) Prior Publication Data
US 2009/0174153 A1 Jul. 9, 2009

(30) Foreign Application Priority Data

May 12, 2006 (JP) .................................. 2006-133559

(51) Int. Cl.
*B29C 33/42* (2006.01)
*B29C 45/00* (2006.01)

(52) U.S. Cl.
USPC ..................... 264/219; 264/297.7; 264/328.1; 249/59; 249/119; 425/588; 425/396; 425/470

(58) Field of Classification Search .................. 264/299, 264/328.1, 328.8, 328.12, 241, 242, 259, 264/260, 281, 286, 287, 219, 328.2, 331.13, 264/297.1; 249/57, 59, 119, 144; 425/588, 425/394–396, 403, 408, DIG. 7, DIG. 47, 425/DIG. 127, DIG. 248, 470; 29/557
See application file for complete search history.

(56) References Cited

U.S. PATENT DOCUMENTS 1,237,554 A * 8/1917 Price .............................. 264/320
1,582,714 A * 4/1926 Wells ............................ 425/470
(Continued)

FOREIGN PATENT DOCUMENTS

DE 4122106 A1 * 1/1993
DE 4215038 A1 * 11/1993
(Continued)

OTHER PUBLICATIONS

Translation of JP 09193170. (date is not applicable).*
(Continued)

*Primary Examiner* — Dimple Bodawala
(74) *Attorney, Agent, or Firm* — Jacobson Holman PLLC (57) ABSTRACT

This invention provides a mold for a gasket, which can render the planar shape of a mold for integral molding of a large-diameter gasket as small as possible to reduce the size of the manufacturing equipment and, at the same time, by virtue of integral molding, does not require labor and time in the manufacture thereof and does not cause a lack of strength in the connecting part. To this end, a mold (1) for molding an endless-type gasket comprises a plurality of molding parts (11, 21), formed by disposing two molding grooves (12, 22), in a spiral wound form, in parallel so as to be adjacent to each other. The spiral wound molding grooves (12, 22) have reversing parts (14, 24) in their respective inner ends (13, 23), and, at the same time, their outer ends (15, 25) are connected to each other in a rope form.

4 Claims, 7 Drawing Sheets

U.S. PATENT DOCUMENTS

| | | | | |
|---|---|---|---|---|
| 2,148,079 | A * | 2/1939 | Martin, Jr. | 249/52 |
| 2,832,996 | A * | 5/1958 | Loftis | 249/95 |
| 3,288,900 | A * | 11/1966 | Morin | 264/149 |
| 3,485,908 | A * | 12/1969 | Burger | 264/102 |
| 3,559,249 | A * | 2/1971 | Patton, Jr. | 425/567 |
| 3,579,799 | A * | 5/1971 | Furstenburg et al. | 29/416 |
| 3,665,069 | A * | 5/1972 | Richmond | 264/219 |
| 4,726,100 | A * | 2/1988 | Etemad et al. | 29/888.022 |
| 4,878,412 | A * | 11/1989 | Resnick | 84/726 |
| 5,125,821 | A * | 6/1992 | Saeki et al. | 425/170 |
| 6,126,422 | A * | 10/2000 | Crum et al. | 418/55.4 |
| 6,468,068 | B1 * | 10/2002 | Abe | 425/553 |
| 6,884,381 | B1 * | 4/2005 | Hashimoto | 264/328.9 |
| 6,916,162 | B2 * | 7/2005 | Schofield et al. | 418/55.2 |
| 7,014,435 | B1 * | 3/2006 | Yanagisawa et al. | 418/55.2 |
| 2007/0207047 | A1 * | 9/2007 | Midorikawa | 418/55.4 |
| 2012/0039733 | A1 * | 2/2012 | Smith et al. | 418/9 |

FOREIGN PATENT DOCUMENTS

| | | |
|---|---|---|
| JP | 08-001723 | 1/1996 |
| JP | 09-193170 | 7/1997 |
| JP | 09193170 A * | 7/1997 |
| JP | 10-138254 | 5/1998 |
| JP | 10-142405 | 5/1998 |
| JP | 2003225917 A * | 8/2003 |

OTHER PUBLICATIONS

Translation of DE 4122106 (date is not applicable).*
International Search Report dated Jul. 17, 2007.

* cited by examiner

MOLD FOR GASKET, METHOD FOR MANUFACTURING THE GASKET, AND GASKET

This is a national stage of the International Application No. PCT/JP2007/059700 filed on May 11, 2007 and published in Japanese language, which has a priority of Japan No. 2006-133559 filed on May 12, 2006, hereby incorporated by reference.

BACKGROUND OF THE INVENTION

1. Field of the Invention

The present invention relates to a mold for a gasket, a method of manufacturing a gasket and a gasket in accordance with a sealing technique.

2. Description of the Conventional Art

As one kind of an endless-shaped gasket, there has been conventionally known widely an O-ring formed as a planar circular ring shape, and the O-ring is formed in various sizes in correspondence to a product specification.

In the case of molding a large-diameter O-ring with the size of a diameter over 1600 mm for example, a size of a used mold comes to 2000 mm in length of one side thereof if it is intended to integrally mold the whole O-ring while keeping a product shape as it is, so that a manufacturing facility is extremely enlarged in size.

Further, there has been developed a method for carrying out a joining work after molding one O-ring divisionally in a circumferential direction, however, in accordance with this method, it takes a lot of labor and time for manufacturing, and concavity and convexity are generated at joint parts of the mold products, so that a lack of strength tends to be caused.

Reference is made to Japanese Unexamined Patent Publication No. 9-193170, Japanese Unexamined Patent Publication No. 10-138254 and Japanese Unexamined Patent Publication No. 10

SUMMARY OF THE INVENTION

Problem to be Solved by the Invention

The present invention is made by taking the above point into consideration, and an object of the present invention is to provide a mold for a gasket, a method for manufacturing a gasket and a gasket, in which a planar shape of a mold for integrally molding a large-diameter gasket is made as small as possible, a manufacturing facility is thereby downsized, increase of labor and time for manufacture due to integral molding is avoided, and any lack of strength due to a joint part is not caused.

Means for Solving the Problem

In order to achieve the object mentioned above, in accordance with a first aspect of the present invention, there is provided a mold for molding an endless-shaped gasket comprising a plurality of molding parts in which two molding grooves aligned in parallel so as to be adjacent to each other are arranged spirally, wherein the spiral molding grooves have reversing parts at inner ends thereof respectively and outer ends thereof are coupled to each other in series.

Further, in accordance with a second aspect of the present invention, there is provided a mold for molding an endless-shaped gasket, comprising a molding part in which two molding grooves aligned in parallel so as to be adjacent to each other are arranged spirally, wherein the spiral molding grooves have a reversing part at an inner end thereof and also have a reserving part at an outer end thereof.

Further, in accordance with a third aspect of the present invention, there is provided a mold as recited in the first aspect or the second aspect, wherein the reversing parts provided at the inner ends of the spiral molding grooves have a planar S-shaped or inverse S-shaped reversing form.

Further, in accordance with a fourth aspect of the present invention, there is provided a manufacturing method, wherein the method is to form a gasket by using the mold as recited in the first aspect, the second aspect or the third aspect.

Further, in accordance with a fifth aspect of the present invention, there is provided a gasket, wherein the gasket is formed by using the mold as recited in the first aspect, the second aspect or the third aspect.

When there are set a plurality of molding parts in which two molding grooves aligned in parallel so as to be adjacent to each other are arranged spirally as in the mold according to the present invention having the above structure, the molding grooves are arranged densely on a plane in each of the molding part. Further, when the reversing part is provided in each of the inner ends of the spiral molding grooves and the outer ends are coupled to each other in series, the gasket having an endless shape as a whole is integrally molded. In accordance with a product specification such as a length in a circumferential direction of the gasket or the like, only one molding part having the spiral molding grooves may be set, and in this case, the reversing part is set at the outer end in addition to the inner end of the spiral molding grooves. An occupying space becomes smallest in the case that the reversing part set at the inner end of the spiral is set to an S-shaped form or an inverse S-shaped form (a laterally reversed shape of the S-shaped form) in a planar shape thereof.

Effect of the invention

Therefore, in accordance with the present invention, since there are set a plurality of molding parts in which two molding grooves aligned in parallel so as to be adjacent to each other are arranged spirally, the molding grooves are arranged densely in each of the molding part. Further, since the reversing part is provided at each of the inner ends of the spiral molding grooves and the outer ends are coupled to each other in series, the gasket having the endless shape as a whole is integrally molded. Therefore, in accordance with the desired object of the present invention, it is possible to provide a mold for a gasket, a method for manufacturing a gasket and a gasket, in which a planar shape of a mold for integrally molding a large-diameter gasket is made as small as possible, a manufacturing facility is thereby downsized, increase of labor and time for manufacture due to integral molding is avoided, and any lack of strength due to a joint par is not caused. Further, even in the case that only one molding part having the spiral molding grooves is set, the same operation and effect can be obtained, and in the case that the planar shape of the reversing part set in the inner end of the spiral is set to the S-shaped form or the inverse S-shaped form, it is possible to make the occupying space smallest.

DETAILED DESCRIPTION OF PREFERRED EMBODIMENT

Next, a description will be given of embodiments in accordance with the present invention with reference to the accompanying drawings.

First Embodiment

Figure 1:
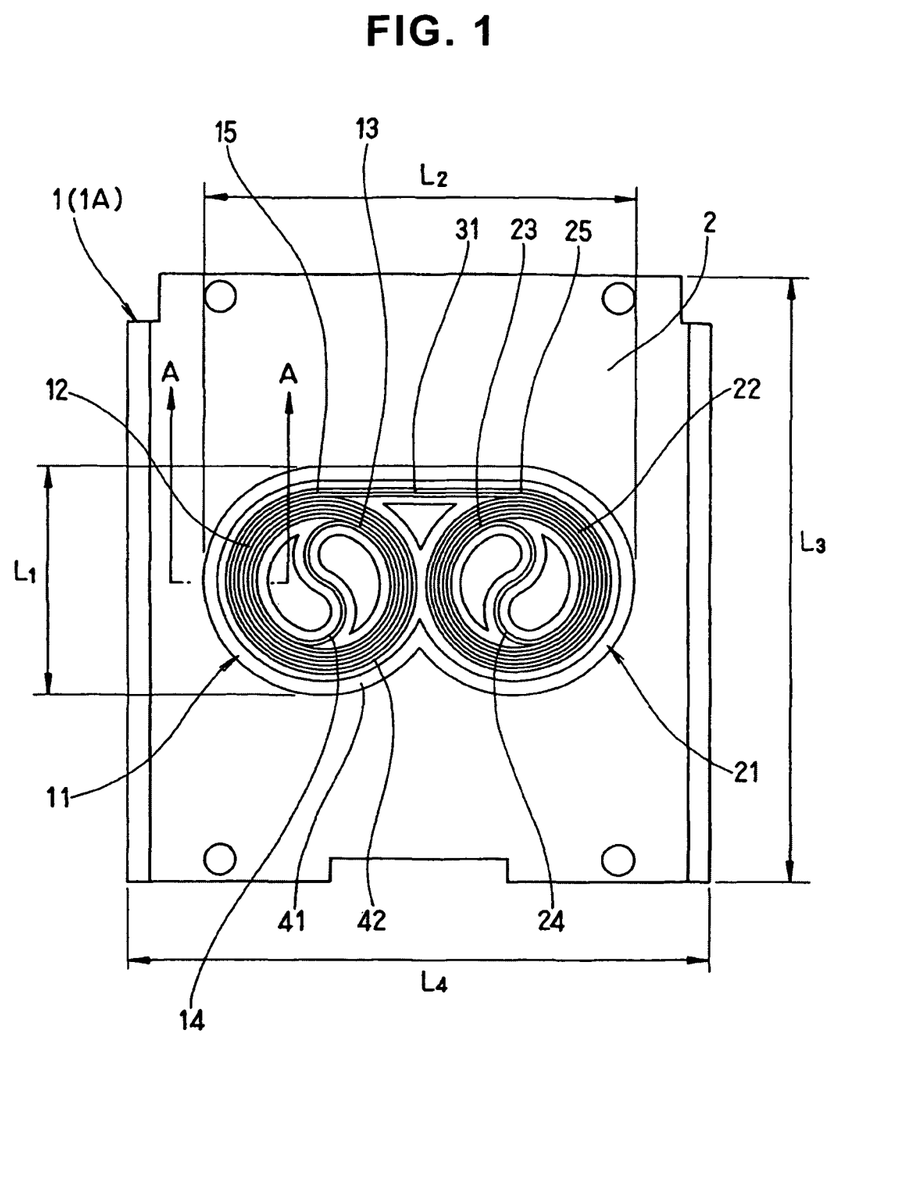
FIG. 1 is a plan view of a mold in accordance with a first embodiment of the present invention.
Figure 2:
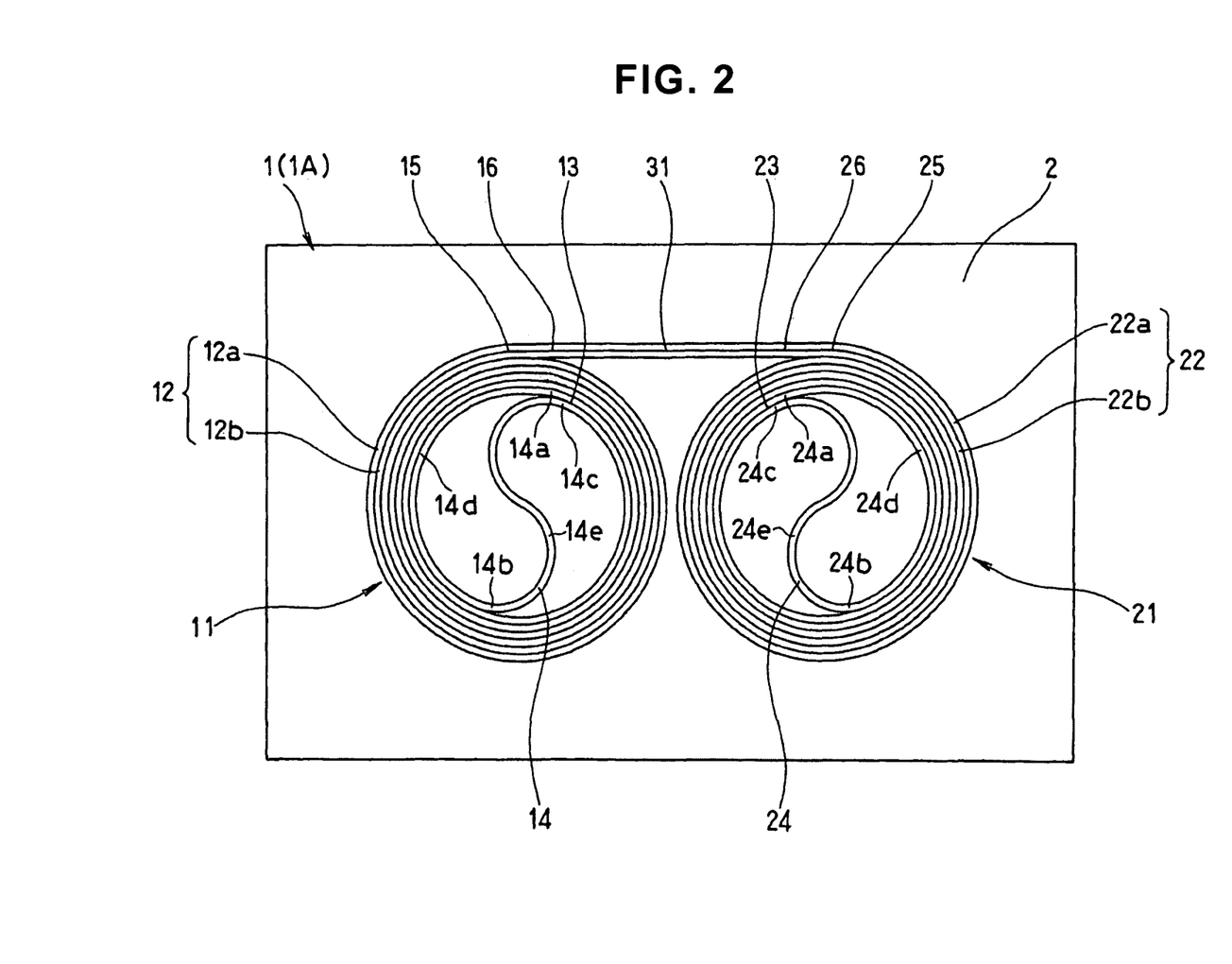
FIG. 2 is an enlarged view of a main part of FIG. 1.
Figure 3:
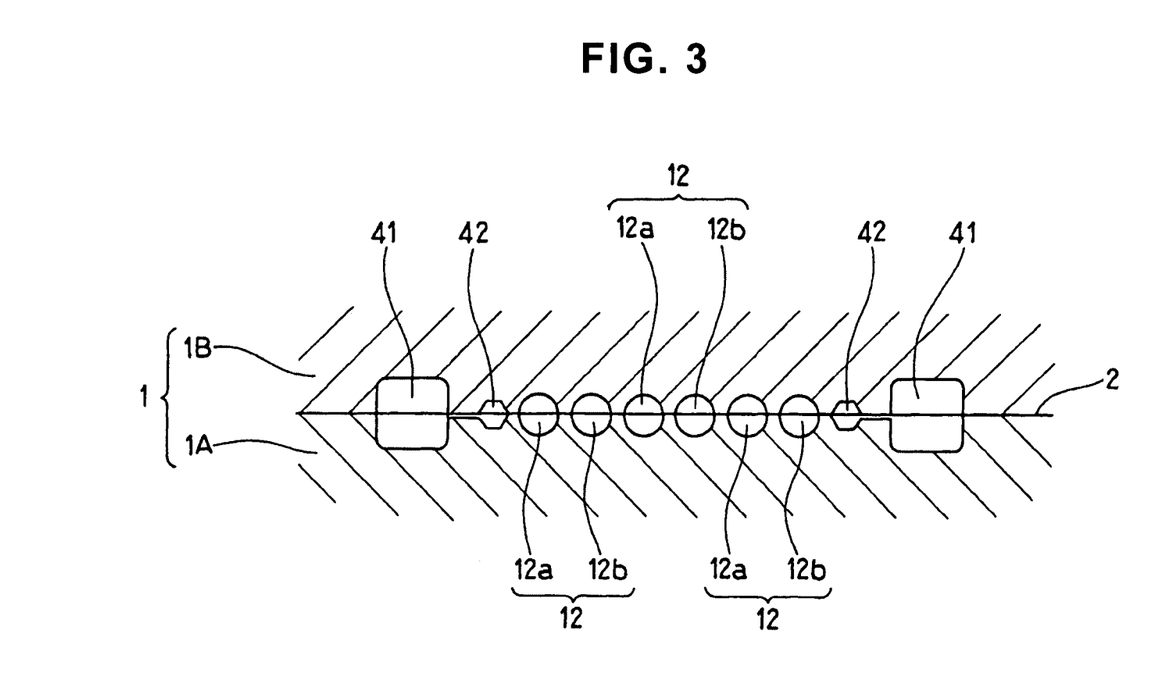
FIG. 3 is a cross sectional view of a main part of the mold and an enlarged cross sectional view along a line A-A in FIG. 1.
Figure 4:
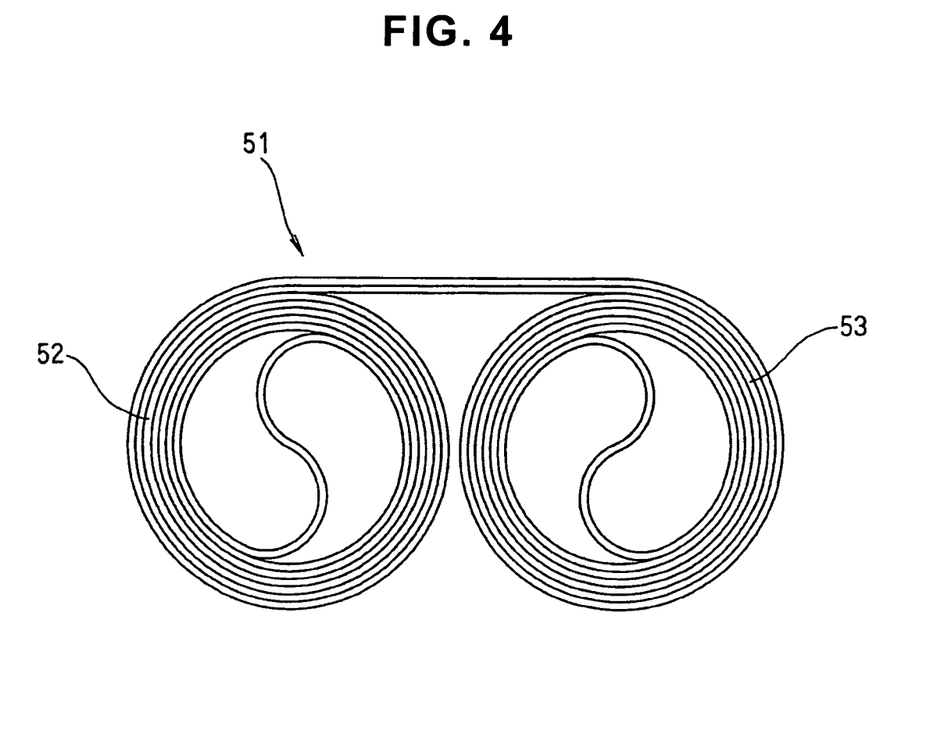
FIG. 4 is a plan view of a molded product molded by the mold.

FIG. 1 shows a plane of a state in which a mold 1 in accordance with a first embodiment of the present invention is opened. FIG. 2 is an enlarged view of a main part of FIG. 1, and FIG. 3 is an enlarged cross sectional view of a main part of FIG. 1. Further, FIG. 4 shows a plane of an O-ring 51 corresponding to a molded product molded by the mold 1.

As shown in FIG. 1, the mold 1 in accordance with the embodiment is structured such as to mold the O-ring 51 (FIG. 4) having a large diameter and formed as a planar circular ring shape in a state of being installed to serve as an endless shaped gasket, and is structured such that molding pars 11 and 21, in which two molding grooves 12 and 22 aligned in parallel so as to be adjacent to each other are spirally arranged, are set in a parting surface 2 of the mold 1 at two positions so as to be laterally arranged side by side, and the spiral molding grooves 12 and 22 respectively have reversing parts 14 and 24 at their inner ends 13 and 23 and a coupling part 31 coupling their outer ends 15 and 25 to each other in series.

One molding part 11 in a left side of the drawing and the other molding part 21 in a right side of the drawing are formed as a line symmetrical shape which is symmetrical bilaterally, and are respectively structured as follows.

As shown in FIG. 2 in an enlarged manner, the one molding part 11 in the left side of the drawing is structured such that a first molding groove at an outer circumferential side shown by reference symbol 12a and a second molding groove at an inner circumferential side shown by reference symbol 12b are aligned in parallel so as to be adjacent to each other, and the molding groove 12 constituted by these two grooves 12a and 12b is set as a spiral shape in a counterclockwise direction on the drawing from an outer end 15 thereof to an inner end 13, and is set as a spiral shape corresponding to approximately three rounds in the drawing. Further, a reversing part 14 is set at the inner end 13 of the spiral molding groove 12 approximately for a half round. In other words, the reversing part 14 is formed as a shape in which a groove reaches a position (an S-shaped form starting point) shown by a reference symbol 14b after extending for approximately a half round from a position (a reverse starting point) shown by reference symbol 14a in the first groove 12a at the outer circumferential side, and returns to a position (a reverse and S-shaped form terminal end) shown by reference symbol 14c in the second groove 12b at the inner circumferential side while forming an approximately S-shaped form from this position 14b. A portion from the reverse starting point 14a to the S-shaped form starting point 14b is formed as a circular arc shaped part 14d, and a portion from the S-shaped form starting point 14b to the reverse and S-shaped form terminal end 14c is formed as an S-shaped part 14e. The reversing part 14 is formed by a combination of the circular arc shaped part 14d and the S-shaped part 14e. A radius of curvature of the S-shaped form in the S-shaped part 14e is set to approximately one half of a radius of an inner diameter of the molding part 11. A linear extension part 16 is set at the outer end 15 in such a manner as to form a tangent line with respect to the molding part 11, and is formed as a part of the coupling part 31.

The other molding part 21 in the right side of the drawing is structured such that a first molding groove at an outer circumferential side shown by reference symbol 22a and a second molding groove at an inner circumferential side shown by reference symbol 22b are aligned in parallel so as to be adjacent to each other, and the molding groove 22 constituted by these two grooves 22a and 22b is set as a spiral shape in a clockwise direction on the drawing from an outer end 25 thereof to an inner end 23, and is set as a spiral shape corresponding to approximately three rounds in the drawing. Further, a reversing part 24 is set at the inner end 23 of the spiral molding groove 22 approximately for a half round. In other words, the reversing part 24 is formed as a shape in which a groove reaches a position (an inverse S-shaped form starting point) shown by a reference symbol 24b after extending for approximately a half round from a position (a reverse starting point) shown by reference symbol 24a in the first groove 22a at the outer circumferential side, and returns to a position (a reverse and inverse S-shaped form terminal end) shown by reference symbol 24c in the second groove 22b at the inner circumferential side while forming an approximately inverse S-shaped form from this position 24b. A portion from the reverse starting point 24a to the inverse S-shaped form starting point 24b is formed as a circular arc shaped part 24d, and a portion from the inverse S-shaped form starting point 24b to the reverse and S-shaped form terminal end 24c is formed as an inverse S-shaped part 24e. The reversing part 24 is formed by a combination of the circular arc shaped part 24d and the inverse S-shaped part 24e. A radius of curvature of the inverse S-shaped form in the inverse S-shaped part 24e is set to approximately one half of a radius of an inner diameter of the molding part 21. A linear extension part 26 is set at the outer end 25 in such a manner as to form a tangent line with respect to the molding part 21, and is formed as a part of the coupling part 31.

The coupling part 31 is constituted by a combination of a pair of extension parts 16 and 26, and is set to one linear shape as a whole.

As shown in a cross section in FIG. 3, a burr groove 41 and a biting groove 42 are respectively provided at an outer circumferential side and an inner circumferential side of the molding parts 11 and 21. Further, since the mold 1 is constituted by a combination of a pair of divided molds 1A and 1B, the molding parts 11 and 21 are provided in the parting surface 2 of each of the divided molds 1A and 1B.

When the O-ring is formed by using the mold 1 having the structure mentioned above, an O-ring 51 shown in FIG. 4 is formed, this O-ring 51 integrally has a portion 52 molded by the one molding part 11 and a portion 53 molded by the other molding part 21, and the large-diameter O-ring 51 is formed by expanding the O-ring 51 on a plane.

As shown in FIG. 1, as a result of a structure in which the molding grooves 12 and 22 are formed as the spiral shape in the respective molding parts 11 and 21 so as to be arranged comparatively densely, a planar shape of the mold 1 is set as small as possible. For example, in the case of molding a large-diameter O-ring having a line diameter of about 1.6 mm and an overall diameter of about 1600 mm, a size of the mold is about 2000 mm in length of one side as mentioned above in accordance with the conventional art, however, a vertical length L1 of both the molding parts 11 and 21 comes to about 180 mm, a horizontal length L2 thereof comes to about 320 mm, and a size of the mold 1 is reduced to about 400 mm in lengths of sides L3 and L4, in accordance with the mold 1. Therefore, in accordance with the embodiment, an extremely remarkable effect can be achieved in the downsizing of the mold 1.

Second Embodiment

Figure 5:
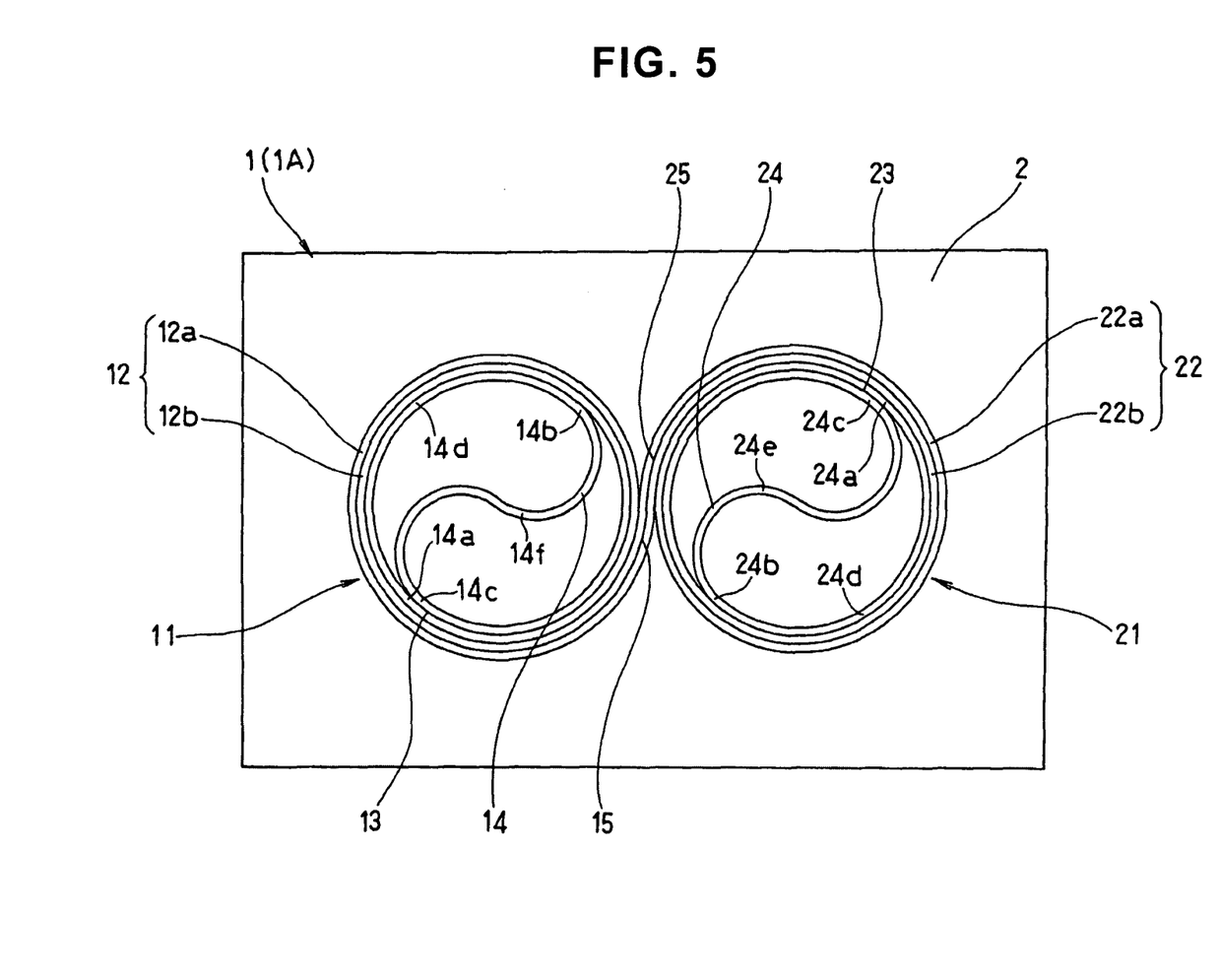
FIG. 5 is a plan view of a main part of a mold in accordance with a second embodiment of the present invention.

In a second embodiment shown in FIG. 5, one molding part 11 in a left side on the drawing and the other molding part 21 in a right side on the drawing are formed as a point symmetrical shape which is symmetrical at 180 degree, and are structured as follows, respectively.

One molding part 11 in the left side of the drawing is structured such that a first molding groove at an outer circumferential side shown by reference symbol 12a and a second molding groove at an inner circumferential side shown by reference symbol 12b are aligned in parallel so as to be adjacent to each other, and the molding groove 12 constituted by these two grooves 12a and 12b is set as a spiral shape in a clockwise direction on the drawing from an outer end 15 thereof to an inner end 13, and is set as a spiral shape corresponding to approximately one and half rounds in the drawing. Further, a reversing part 14 is set at the inner end 13 of the spiral molding groove 12 approximately for a half round. In other words, the reversing part 14 is formed as a shape in which a groove reaches a position (an inverse S-shaped form starting point) shown by a reference symbol 14b after extending for approximately a half round from a position (a reverse starting point) shown by reference symbol 14a in the first groove 12a at the outer circumferential side, and returns to a position (a reverse and inverse S-shaped form terminal end) shown by reference symbol 14c in the second groove 12b at the inner circumferential side while forming an approximately inverse S-shaped form from this position 14b. A portion from the reverse starting point 14a to the inverse S-shaped form starting point 14b is formed as a circular arc shaped part 14d, and a portion from the inverse S-shaped form starting point 14b to the reverse and inverse S-shaped form terminal end 14c is formed as an inverse S-shaped part 14f. The reversing part 14 is formed by a combination of the circular arc shaped part 14d and the inverse S-shaped part 14f. A radius of curvature of the inverse S-shaped form in the inverse S-shaped part 14f is set to approximately one half of a radius of an inner diameter of the molding part 11. The outer end 15 is directly connected to the outer end 25 of the other molding part 21 without having a linear portion (the extension part) as described in the first embodiment mentioned above.

The other molding part 21 in the right side of the drawing is structured such that a first molding groove at an outer circumferential side shown by reference symbol 22a and a second molding groove at an inner circumferential side shown by reference symbol 22b are aligned in parallel so as to be adjacent to each other, and the molding groove 22 constituted by these two grooves 22a and 22b is set as a spiral shape in a clockwise direction on the drawing from an outer end 25 thereof to an inner end 23, and is set as a spiral shape corresponding to approximately one and half round in the drawing. Further, a reversing part 24 is set at the inner end 23 of the spiral molding groove 22 approximately for a half round. In other words, the reversing part 24 is formed as a shape in which a groove reaches a position (an inverse S-shaped form starting point) shown by a reference symbol 24b after extending for approximately a half round from a position (a reverse starting point) shown by reference symbol 24a in the first groove 22a at the outer circumferential side, and returns to a position (a reverse and inverse S-shaped form terminal end) shown by reference symbol 24c in the second groove 22b at the inner circumferential side while forming an approximately inverse S-shaped form from this position 24b. A portion from the reverse starting point 24a to the inverse S-shaped form starting point 24b is formed as a circular arc shaped part 24d, and a portion from the inverse S-shaped form starting point 24b to the reverse and S-shaped form terminal end 24c is formed as an inverse S-shaped part 24e. The reversing part 24 is formed by a combination of the circular arc shaped part 24d and the inverse S-shaped part 24e. A radius of curvature of the inverse S-shaped form in the inverse S-shaped part 24e is set to approximately one half of a radius of an inner diameter of the molding part 21. The outer end 25 is directly connected to the outer end 15 of the one molding part 11 without having a linear portion (the extension part) as described in the first embodiment mentioned above.

Figure 6:
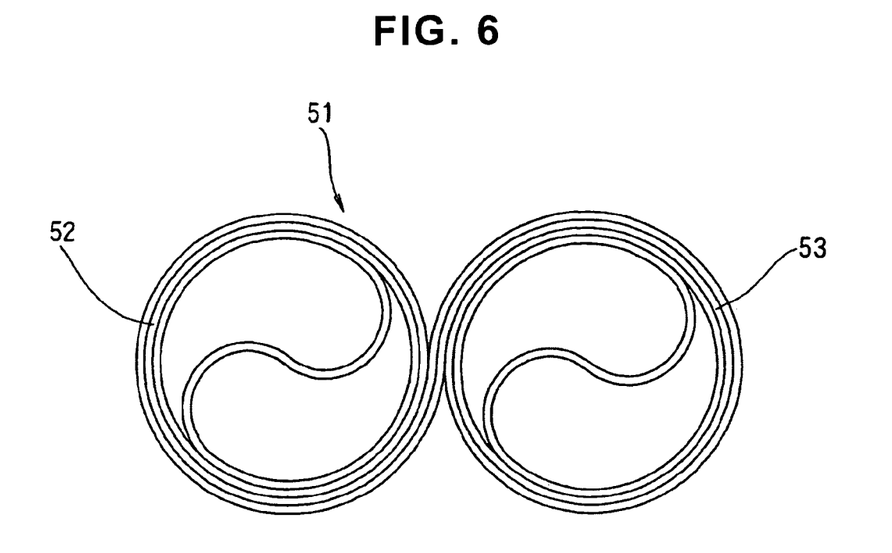
FIG. 6 is a plan view of a molded product molded by the mold.

When the O-ring is formed by using the mold 1 having the structure mentioned above, an O-ring 51 shown in FIG. 6 is molded, and the O-ring 51 integrally has a portion 52 molded by the one molding part 11 and a portion 53 molded by the other molding part 21, and the large-diameter O-ring 51 is formed by expanding the O-ring 51 on a plane. The other structures, operations and effects of the second embodiment are the same as those of the first embodiment mentioned above.

Third Embodiment

Figure 7:
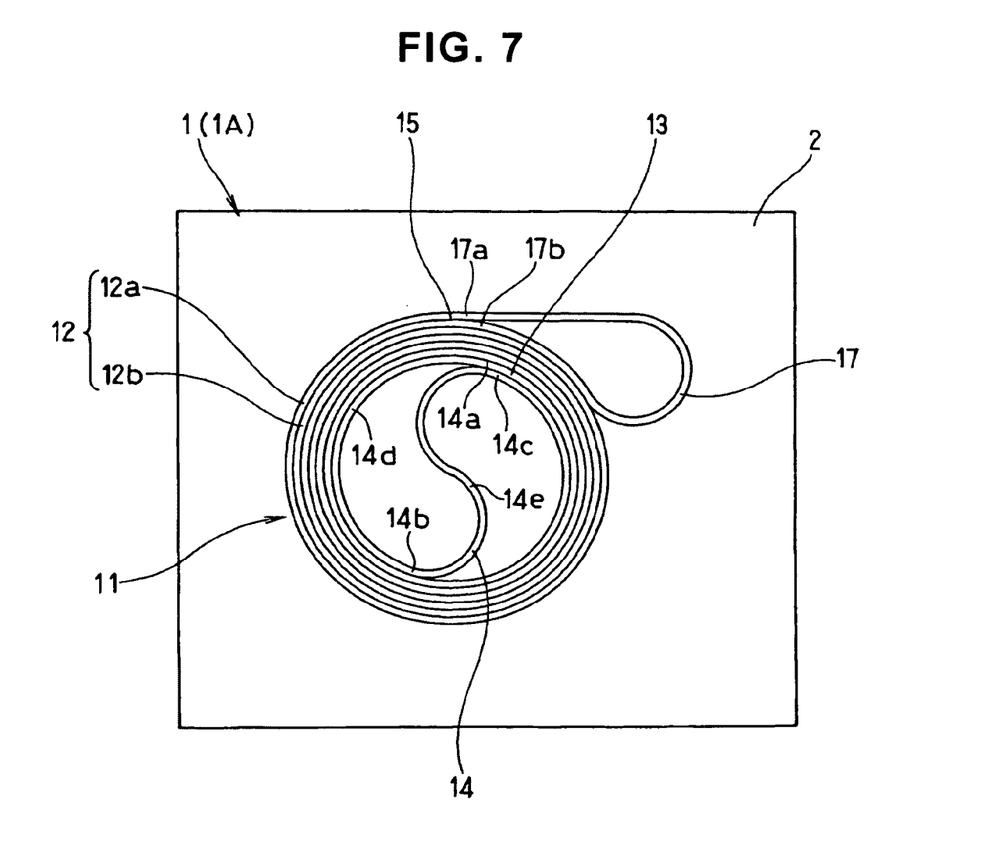
FIG. 7 is a plan view of a main part of a mold in accordance with a third embodiment of the present invention.

In a third embodiment shown in FIG. 7, the molding part 11, in which two molding grooves 12 aligned in parallel so as to be adjacent to each other are arranged spirally, is set at only one position, and the spiral molding groove 12 has a reversing part 14 at an inner end 13 and has a reversing part 17 at an outer end 15.

The molding part 11 is structured such that a first molding groove at an outer circumferential side shown by reference symbol 12a and a second molding groove at an inner circumferential side shown by reference symbol 12b are aligned in parallel so as to be adjacent to each other, and the molding groove 12 constituted by these two grooves 12a and 12b is set as a spiral shape in a counterclockwise direction on the drawing from an outer end 15 thereof to an inner end 13, and is set as a spiral shape corresponding to approximately three rounds in the drawing. Further, a reversing part 14 is set at the inner end 13 of the spiral molding groove 12 for approximately a half round. In other words, the reversing part 14 is formed as a shape in which a groove reaches a position (an S-shaped form starting point) shown by a reference symbol 14b after extending for approximately a half round from a position (a reverse starting point) shown by reference symbol 14a in the first groove 12a at the outer circumferential side, and returns to a position (a reverse and S-shaped form terminal end) shown by reference symbol 14c in the second groove 12b at the inner circumferential side while forming an approximately S-shaped form from this position 14b. A portion from the reverse starting point 14a to the S-shaped form starting point 14b is formed as a circular arc shaped part 14d, and a portion from the S-shaped form starting point 14b to the reverse and S-shaped form terminal end 14c is formed as an S-shaped part 14e. The reversing part 14 is formed by a combination of the circular arc shaped part 14d and the S-shaped part 14e. A radius of curvature of the S-shaped form in the S-shaped part 14e is set to approximately one half of a radius of an inner diameter of the molding part 11. The reversing part 17 provided at the outer end 15 is formed as a shape in which a groove returns to a position (a reverse terminal end) shown by reference symbol 17b in the second groove 12b at the inner circumferential side while forming an approximately U-shaped form from a position (a reverse starting point) shown by reference symbol 17a in the first groove 12a at the outer circumferential side.

Figure 8:
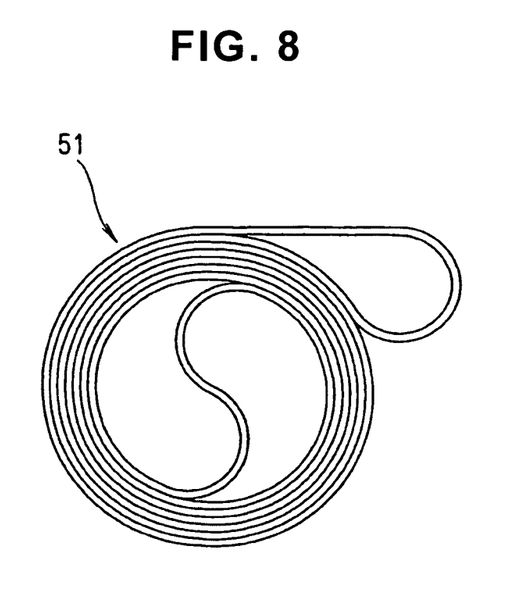
FIG. 8 is a plan view of a molded product molded by the mold.

When the O-ring is formed by using the mold 1 having the structure mentioned above, an O-ring 51 shown in FIG. 8 is molded, and the large-diameter O-ring 51 is formed by expanding the O-ring 51 on a plane. The other structures, operations and effects of the third embodiment are the same as those of the first embodiment mentioned above. In this case, in each of the embodiments mentioned above, the O-ring 51 is described as the molded product, however, the molded product may be other kinds of gaskets. Further, the O-ring 51 is generally formed by a rubber material, however, the material thereof is not particularly limited.

What is claimed is:

1. A mold for molding an endless-shaped gasket, comprising:
    a plurality of molding parts in which two molding grooves aligned in parallel so as to be adjacent to each other are arranged spirally,
    said spiral molding grooves having reversing parts at inner ends thereof respectively and outer ends thereof being coupled to each other in series,
    the reversing parts provided at the inner ends of the spiral molding grooves having a planar S-shaped or inverse S-shaped reversing form.

2. A mold for molding an endless-shaped gasket, comprising:
    a molding part in which two molding grooves aligned in parallel so as to be adjacent to each other are arranged spirally,
    said spiral molding grooves having a reversing part at an inner end thereof and also have a reserving part at an outer end thereof,
    the reversing parts provided at the inner ends of the spiral molding grooves having a planar S-shaped or inverse S-shaped reversing form.

3. The method of manufacturing a gasket, wherein the method is to form a gasket by using the mold as claimed in claim 1.

4. The method of manufacturing a gasket, wherein the method is to form a gasket by using the mold as claimed in claim 1.

* * * * *

UNITED STATES PATENT AND TRADEMARK OFFICE
CERTIFICATE OF CORRECTION

PATENT NO. : 8,419,992 B2 Page 1 of 1
APPLICATION NO. : 12/227065
DATED : April 16, 2013
INVENTOR(S) : Asai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1197 days.

Signed and Sealed this
First Day of September, 2015

Michelle K. Lee
*Director of the United States Patent and Trademark Office*